(12) United States Patent
Hill et al.

(10) Patent No.: US 11,937,559 B2
(45) Date of Patent: Mar. 26, 2024

(54) HYDROPONICS WATER LEVEL INDICATOR

(71) Applicant: MODERN GARDEN SYSTEMS, LLC, Chelsea, MI (US)

(72) Inventors: Brendan Hill, Chelsea, MI (US); Hakki Tomanbay, Chelsea, MI (US)

(73) Assignee: Modern Garden Systems, LLC, Chelsea, MI (US)

( * ) Notice: Subject to any disclaimer, the term of this patent is extended or adjusted under 35 U.S.C. 154(b) by 63 days.

(21) Appl. No.: 17/517,364

(22) Filed: Nov. 2, 2021

(65) Prior Publication Data
US 2022/0132759 A1    May 5, 2022

Related U.S. Application Data

(60) Provisional application No. 63/108,841, filed on Nov. 2, 2020.

(51) Int. Cl.
| | | |
|---|---|---|
| *G01F 23/24* | (2006.01) | |
| *A01G 27/00* | (2006.01) | |
| *A01G 31/02* | (2006.01) | |

(52) U.S. Cl.
CPC .......... *A01G 31/02* (2013.01); *A01G 27/008* (2013.01); *G01F 23/24* (2013.01)

(58) Field of Classification Search
CPC ...... G01F 23/24; G01F 23/241; G01F 23/242; G01F 23/261; G01F 23/265
See application file for complete search history.

(56) References Cited

U.S. PATENT DOCUMENTS

| | | | |
|---|---|---|---|
| 1,388,479 A | 8/1921 | Nickum | |
| 1,504,978 A * | 8/1924 | Robbins | G01F 23/241 |
| | | | 73/304 R |
| 3,909,948 A | 10/1975 | Markfelt | |
| 4,992,030 A * | 2/1991 | Hasslen, III | F04D 29/606 |
| | | | 417/423.15 |

(Continued)

FOREIGN PATENT DOCUMENTS

| | | |
|---|---|---|
| JP | 2008253165 | 10/2008 |
| WO | 2022094471 | 5/2022 |

OTHER PUBLICATIONS

Youtube; Video for "How to make a 10 steps Water Level Indicator (MOSFET circuit)", published Jan. 25, 2018, available at <https://www.youtube.com/watch?v=LnxZnZmwhyl >, 1 pg.

(Continued)

*Primary Examiner* — Herbert K Roberts
(74) *Attorney, Agent, or Firm* — Taylor English Duma LLP

(57) ABSTRACT

A submersible member can include an elongated body defining an outer body surface, the body defining a top end and a bottom end; a base electrode extending through the outer body surface; a first conductive member extending through the body from the top end to the base electrode, the first conductive member connected in electrical communication with the base electrode; an indicator electrode extending through the outer body surface, the indicator electrode positioned between the top end and the base electrode; and a second conductive member extending through the body from the top end to the indicator electrode, the second conductive member connected in electrical communication with the indicator electrode.

17 Claims, 10 Drawing Sheets

(56) References Cited

U.S. PATENT DOCUMENTS

| | | | |
|---|---|---|---|
| 5,826,374 A | | 10/1998 | Baca |
| 5,923,102 A | * | 7/1999 | Koenig ................. G01F 23/242 |
| | | | 417/279 |
| 6,820,483 B1 | | 11/2004 | Beckerman |
| 2003/0010117 A1 | * | 1/2003 | Shon ....................... G01F 23/24 |
| | | | 73/304 R |
| 2005/0156962 A1 | | 7/2005 | Sasaki et al. |
| 2010/0004879 A1 | | 1/2010 | Lin et al. |
| 2014/0020463 A1 | | 1/2014 | Ikeya et al. |
| 2014/0075841 A1 | | 3/2014 | Degraff |
| 2015/0208598 A1 | | 7/2015 | Kern |
| 2015/0334928 A1 | | 11/2015 | Kort |
| 2016/0202103 A1 | * | 7/2016 | Heinonen ............. G01F 23/242 |
| | | | 73/304 C |
| 2017/0120307 A1 | | 5/2017 | Shanahan et al. |
| 2018/0220606 A1 | | 8/2018 | Daniel |
| 2019/0128726 A1 | | 5/2019 | Zorzetto |

OTHER PUBLICATIONS

Youtube; Video for "Water level indicator", published Jan. 19, 2020, available at <https://www.youtube.com/watch?v=q_tRP5GNvTQ>, 1 pg.

Grainger; Article entitled: "Water Level Control Fill w/ Low Alarm", available at https://www.grainger.com/product/WATERLINE-CONTROLS-Water-Level-Control-8-3-4-4GHK5.

Allied Elctronics Automation; Article entitled: "Omron Automation PS-5S", located at <https://www.alliedelec.com/product/omron-automation/ps-5s/72067822/?utm_source=google&utm_medium=organic&utm_campaign=surfaces%20across%20google>, publicly available prior to Nov. 2, 2021, 2 pgs.

Daniel, Kevin M.; U.S. Provisional Application entitled: Combination Tiered Modular Kit Assembly Including Hydroponic Basket for Growing Plants in a Bucket, having U.S. Appl. No. 62/484,662, filed Apr. 12, 2017, 35 pgs.

Kort, Dale A.; U.S. Provisional Application entitled: Trellis System Support Member and Hydroponic Trellis System Including Same, having U.S. Appl. No. 62/001,288, filed May 21, 2014, 7 pgs.

Kern, Lynn; U.S. Provisional Application entitled: Hydroponic Nutrient Delivery Gardening System, having U.S. Appl. No. 61/932,889, filed Jan. 19, 2014, 12 pgs.

Hill, Brendan; International Search Report and Written Opinion for PCT Application No. PCT/US21/57738, filed Nov. 2, 2021, dated Mar. 24, 2022, 11 pgs.

Hill, Brendan; Invitation to Pay Additional Fees for PCT/US21/57738, filed Nov. 2, 2021, dated Jan. 20, 2022, 2 pgs.

* cited by examiner

HYDROPONICS WATER LEVEL INDICATOR

CROSS-REFERENCE TO RELATED APPLICATIONS

This application claims the benefit of U.S. Provisional Application 63/108,841, filed on Nov. 2, 2020, which is hereby incorporated in its entirety by reference.

TECHNICAL FIELD

This disclosure relates to a water level indicator. More specifically, this disclosure relates to a water level indicator for hydroponic applications.

BACKGROUND

Hydroponics is a type of horticulture wherein plants are typically grown without soil. Nutrients and minerals are dissolved into water and delivered to the plants through the water. To achieve optimal growth and productivity for the plants, concentrations of nutrients and minerals within the water are maintained in certain concentration ranges. Hydroponics is frequently practiced indoors, and artificial light is often provided to the plants. Increasingly, hydroponic techniques are being utilized to grow plants for personal use and commercial production in areas where typical agricultural techniques are not viable due to environmental factors or limitations on available land. For example, some individuals utilize hydroponics to grow fresh produce in small apartments and other dwellings with limited outdoor space.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

Disclosed is a submersible member comprising an elongated body defining an outer body surface, the body defining a top end and a bottom end; a base electrode extending through the outer body surface; a first conductive member extending through the body from the top end to the base electrode, the first conductive member connected in electrical communication with the base electrode; an indicator electrode extending through the outer body surface, the indicator electrode positioned between the top end and the base electrode; and a second conductive member extending through the body from the top end to the indicator electrode, the second conductive member connected in electrical communication with the indicator electrode.

Also disclosed is a hydroponic system comprising an irrigation assembly comprising a junction box comprising at least one indicator; a conduit coupled to the junction box; and a submersible member coupled to the conduit opposite from the junction box, the submersible member defining a top end and a bottom end, the submersible member comprising at least one indicator electrode and a base electrode, the at least one indicator electrode positioned between the base electrode and the top end, the at least one indicator electrode connected in electrical communication with the at least one indicator; a reservoir comprising at least partially filled with water, the submersible member at least partially submerged in the water; and wherein the irrigation assembly is configured to detect a water level of the water in the reservoir.

Also disclosed is a method for forming a submersible member, the method comprising positioning a first conductive member and a second conductive member in a mold; positioning a base electrode in the mold; connecting the base electrode in electrical communication with the first conductive member; inserting a liquid into the mold around the first conductive member, the second conductive member, and the base electrode; solidifying the liquid to form a body, the first conductive member, the second conductive member, and the base electrode embedded within the body; and forming a lower bore within the body extending from a top end of the body towards a bottom end of the body.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The features and components of the following figures are illustrated to emphasize the general principles of the present disclosure. The drawings are not necessarily drawn to scale. Corresponding features and components throughout the figures may be designated by matching reference characters for the sake of consistency and clarity.

DETAILED DESCRIPTION

Figure 1:
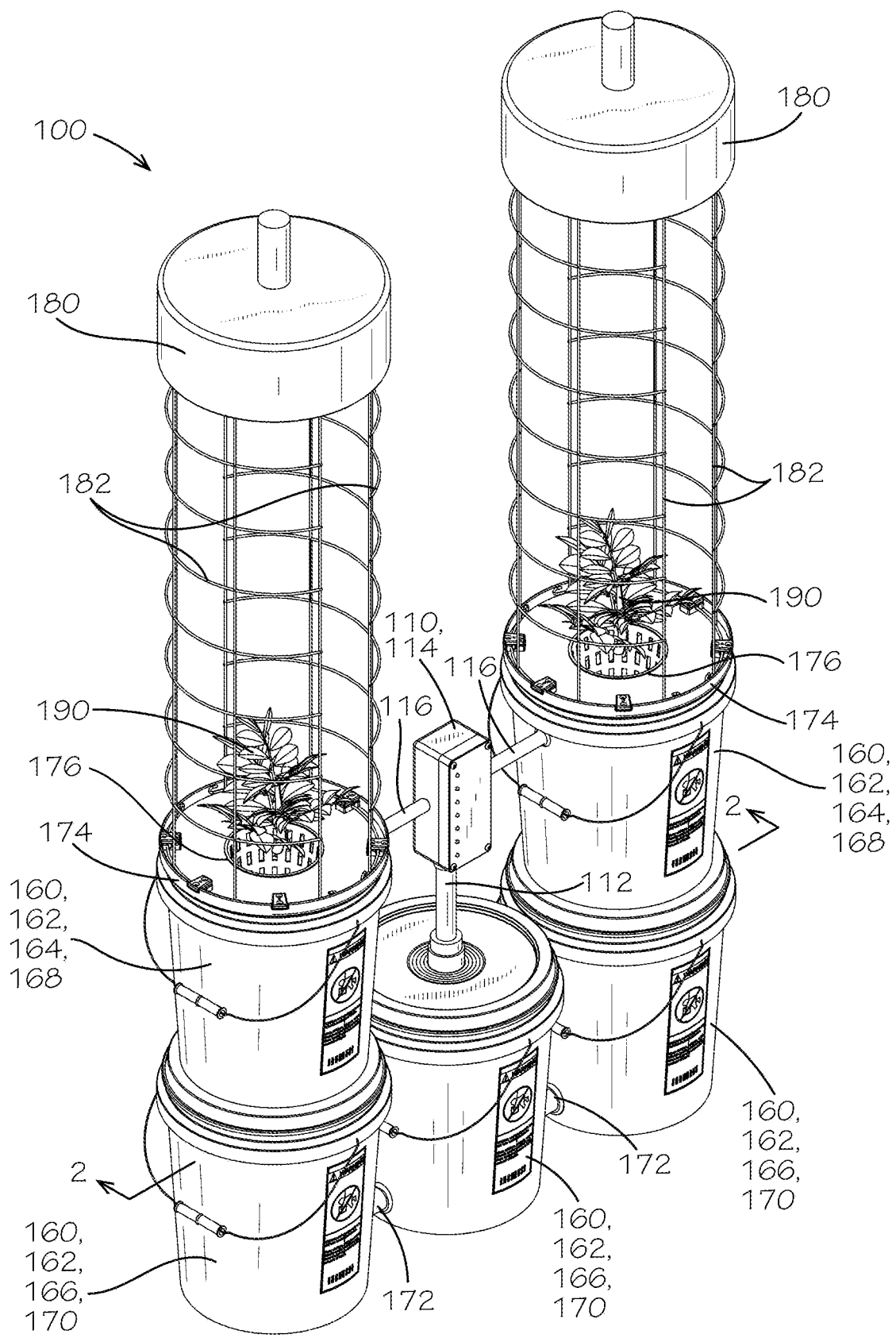
FIG. 1 is a perspective front view of a hydroponic system comprising an irrigation assembly, a reservoir, one or more light fixtures, and one or more plants in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed, that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a hydroponic system and associated methods, systems, devices, and various apparatus. The hydroponic system can comprise an irrigation assembly, a reservoir, one or more light fixtures, and one or more plants. It would be understood by one of skill in the art that the disclosed hydroponic system is described in but a few exemplary aspects among many. No particular terminology or description should be considered limiting on the disclosure or the scope of any claims issuing therefrom.

FIG. 1 is a perspective front view of a hydroponic system 100 comprising an irrigation assembly 110, a reservoir 160, one or more light fixtures 180, and one or more plants 190 in accordance with one aspect of the present disclosure.

The irrigation assembly 110 can comprise a probe 112, a junction box 114, and one or more irrigation branches 116. In the present aspect, the junction box 114 can route water from the probe 112 to the one or more irrigation branches 116. The irrigation assembly 110 can act as a water level indicator for the reservoir 160. The probe 112 can measure a sump water level 300 (shown in FIG. 3) in the reservoir 160, and the junction box 114 can provide an indication of the sump water level 300 in the reservoir 160.

The reservoir 160 can comprise a plurality of containers 162. In the present aspect, the containers 162 can be modified buckets. For example and without limitation, the containers 162 can be modified five-gallon buckets. The containers 162 can comprise high-density polyethylene ("HDPE"), low-density polyethylene ("LDPE"), polypropylene ("PP"), polyvinyl chloride ("PVC"), chlorinated polyvinyl chloride ("CPVC"), polyethylene terephthalate ("PET"), a composite material, such as fiberglass, a metal, or any other suitable material, for example and without limitation. Some or all of the containers 162 can be interconnected. The reservoir 160 can comprise an upper level, or growing level, 164 and a lower level, or sump level 166. The containers 162 comprising the upper level 164 can be growing containers 168, and the containers 162 comprising the lower level 166 can be sump containers 170. The sump containers 170 can be interconnected by one or more sump pipes 172. The sump pipes 172 can extend between adjacent sump containers 170.

The probe 112, the junction box 114, the irrigation branches 116, and the sump pipes 172 can comprise HDPE, LDPE, PP, PVC, CPVC, rubber, urethane, PET, a composite material, such as fiberglass, a metal, or any other suitable material.

The probe 112 can extend into one of the sump containers 170. As noted above and described in greater detail below, the probe 112 can be configured to measure the sump water level 300 of the reservoir 160. Specifically, the probe 112 can measure the sump water level 300 of the sump level 166 of the reservoir 160. The probe 112 can also route water from the sump level 166 to the growing level 164.

The growing containers 168 can be stacked atop the sump containers 170. The irrigation branches 116 can be routed into the growing containers 168. The growing containers 168 can be configured to drain into the sump containers 170, as described in greater detail below with respect to FIG. 3. The growing containers 168 can each comprise an open lid 174. Each growing container 168 can hold one of the plants 190, which can extend through the open lid 174. In some aspects, multiple plants 190 can be positioned in each growing container 168. The open lids 174 can define one or more openings 176, and the plant or plants 190 can extend through the openings 176. The irrigation branches 116 can supply water to the plants 190.

One or more light fixtures 180 can be positioned over the growing level 164. Each light fixture 180 can be configured to provide light to one or more of the plants 190. In the present aspect, one light fixture 180 can be positioned over each growing container 168. In some aspects, one light fixture 180 can provide light for some or all of the growing containers 168. One or more support members 182 can extend between the upper level 164 and the one or more light fixtures 180. In some aspects, the support members 182 can support the one or more light fixtures 180 above the growing containers 168. In some aspects, the one or more light fixtures 180 can be suspended, such as from a ceiling, for example and without limitation, and the support members 182 can be supported, such as by being at least partially suspended from the one or more light fixtures 180.

The support members 182 can be configured to support the plants 190, similar to a trellis, lattice, tomato cage, stake, or other common garden support. For example, plants 190 that climb, such as vines and many common legumes, can climb the support members 182. Plants 190 that spread outwards, such as tomatoes, can be supported by the support members 182 to help prevent the plants 190 from breaking or overturning under the weight of their fruit.

Figure 2:
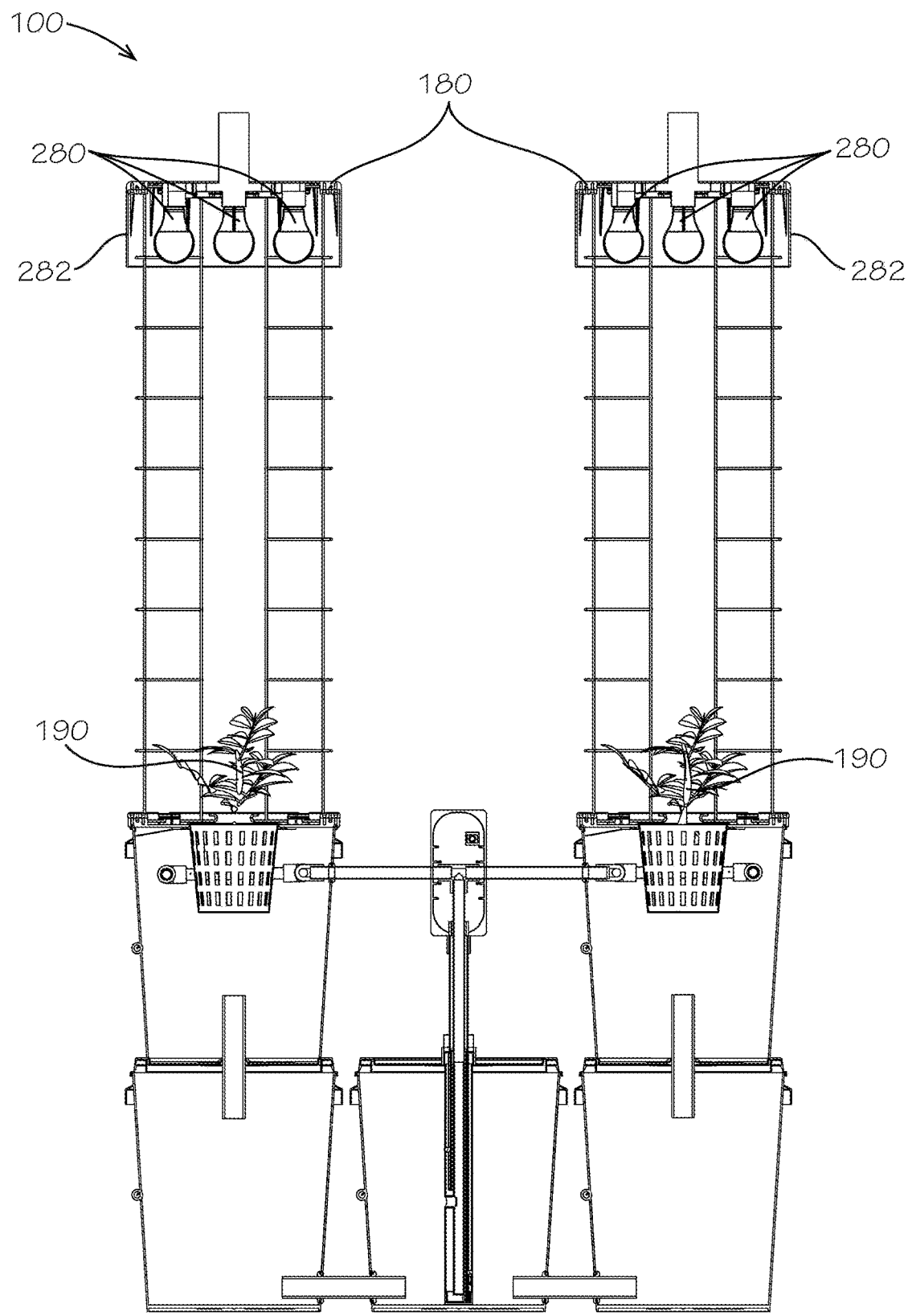
FIG. 2 is a cross-sectional view of the hydroponic system of FIG. 1 taken along line 2-2, shown in FIG. 1.

FIG. 2 is a cross-sectional view of the hydroponic system 100 of FIG. 1 taken along line 2-2, shown in FIG. 1.

The light fixtures 180 can each comprise one or more light sources 280. The light sources 280 can be at least partially enclosed by a shroud 282. The light sources 280 and the shroud 282 can cooperate to direct and focus light downwards onto the plants 190. The light sources 280 can be any type of light source, such as light-emitting diodes, incandescent bulbs, florescent lights, halogen lights, or any other suitable type of light source. The light sources 280 can be optimized to promote growth of the plants 190, such as by emitting light over certain wavelengths and/or color temperatures.

Figure 3:
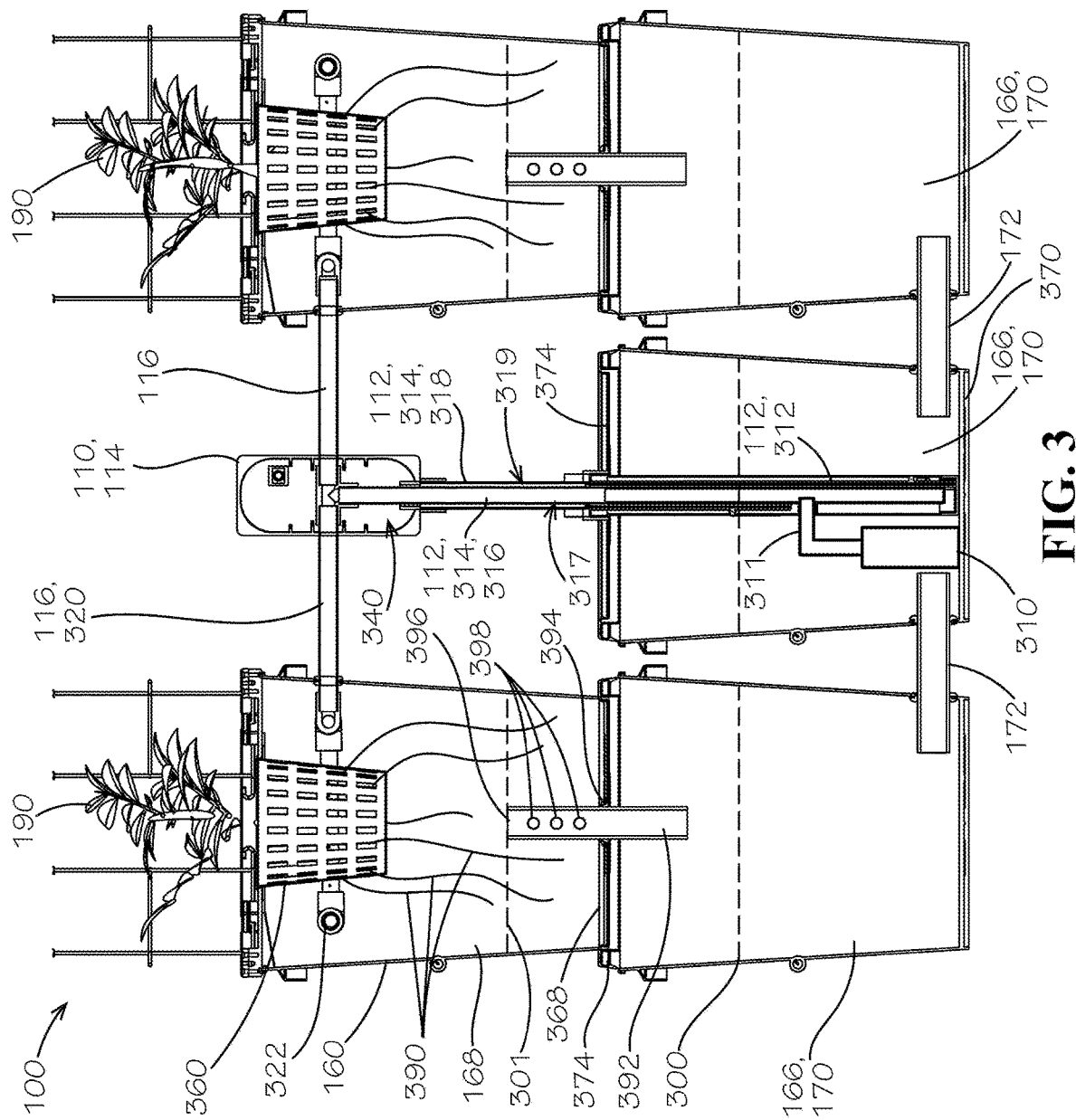
FIG. 3 is a detailed cross-sectional view of the irrigation assembly, the reservoir, and the plants of the hydroponic system of FIG. 1, taken along line 2-2, shown in FIG. 1.

FIG. 3 is a detailed cross-sectional view of the irrigation assembly 110, the reservoir 160, and the plants 190 of the hydroponic system 100 of FIG. 1, taken along line 2-2 as shown in FIG. 1.

The sump level 166 can be at least partially filled with water, as represented by the sump water level 300. The sump water level 300 can rise and fall within the hydroponic system 100 over time. For example, the hydroponic system 100 can lose water through evaporation and transpiration, and the reservoir 160 can be refilled with fresh water. The sump pipes 172 can connect the sump containers 170 to maintain the sump water level 300 at substantially the same height across the individual sump containers 170 of the sump level 166.

The probe 112 can comprise a submersible member 312 and a conduit 314. The submersible member 312 can extend through a lid 374 of one of the sump containers 170. In the present aspect, the submersible member 312 can extend to a bottom end 370 of one of the sump containers 170. As described in greater detail below, the submersible member 312 can measure the sump water level 300 to determine a volume of water in the sump level 166.

The conduit 314 can extend between the submersible member 312 and the junction box 114. The conduit 314 can comprise an inner pipe 316 and an outer pipe 318. The inner pipe 316 can define an upper bore 317. A conduit annular cavity 319 can be defined between the inner pipe 316 and the outer pipe 318. The inner pipe 316 and the upper bore 317 can connect with the irrigation branches 116. The conduit annular cavity 319 can connect with a junction box cavity 340 of the junction box 114. In the present aspect, the conduit annular cavity 319 can enclose one or more wires 990 (shown in FIGS. 9 and 10) extending from the submersible member 312 to the junction box cavity 340.

The irrigation assembly 110 can further comprise a sump pump 310. The sump pump 310 can be a submergible pump. The sump pump 310 can be positioned at least partially beneath the sump water level 300 within the reservoir 160. The sump pump 310 can be connected to the probe 112. In some aspects, the sump pump 310 can be connected directly to the probe 112. In the present aspect, the sump pump 310 can be connected to the submersible member 312 of the probe 112 with a discharge line 311. The discharge line 311 can be rigid, such as piping, or flexible, such as a hose or tubing.

The sump pump 310 can pump water from the sump level 166 upwards to the irrigation branches 116. In the present aspect, the inner pipe 316 can intersect with the irrigation branches 116 within the junction box cavity 340, and the junction box 114 can distribute the water to the irrigation branches 116, which can in turn supply water to the plants 190. In some aspects, the inner pipe 316 can intersect the irrigation branches 116 external to the junction box cavity 340.

As demonstrated by the left irrigation branch 116, each irrigation branch 116 can comprise a pipe 320 and an irrigation ring 322. The pipes 320 can extend from the junction box 114 to the irrigation rings 322. The irrigation ring 322 can be disposed within one of the growing containers 168, and the pipe 320 can extend into the growing container 168. The irrigation rings 322 can extend around pots 360. The irrigation rings 322 can each define a plurality of openings 418 (shown in FIG. 4) facing inwards towards the respective encircled pots 360.

The pots 360 can be configured for roots 390 of the plants 190 to grow through the pots 360. As water is pumped through the irrigation branches 116, the water can be sprayed onto the pots 360 and the roots 390 of the plants 190. Depending upon the types of plants 190 to be grown, the pots 360 can be drained pots, closed pots, baskets, or any other suitable type of container. The pots 360 can comprise man-made materials, such as polymers, ceramics, or other man-made materials, or natural materials, such as peat, jute, hemp, or other natural materials.

As demonstrated by the left growing container 168 and the left sump container 170, a drainpipe 392 can extend from each growing container 168 to the sump container 170 positioned below it. The drainpipe 392 can extend through the lid 374 of the sump container 170. A seal 394, such as a grommet, washer, O-ring, gasket, or other type of seal, can prevent leakage between the drainpipe 392, the lid 374, and a bottom end 368 of the growing container 168.

In some aspects, the positioning of the drainpipe 392 can set an upper water level 301 within the growing containers 168, wherein water can be retained within the bottom of the growing containers 168 at the upper water level 301 approximately equal to a top end 396 of the drainpipe 392. As more water is pumped into the growing containers 168, the water can flow into the top end 396 of the drainpipe 392, thereby preventing the water level within the growing containers 168 from rising a substantial distance above the top end 396 of the drainpipe 392. The roots 390 can grow into the retained water below the upper water level 301.

In some aspects, the drainpipe 392 may not be configured to indefinitely retain water in the growing containers 168. In some aspects, the drainpipe 392 can be configured to provided a residence time, or dwell time, for water sprayed into each growing container 168. For example, the sump pump 310 can be configured to operate on an interval, wherein water can be pumped into the growing containers 168 for a first period of time and can then be allowed to drain from the growing containers 168 for a second period of time.

The drainpipe 392 can define one or more ports 398. The ports 398 are shown distributed lengthwise along the drainpipe 392, but this arrangement should not be viewed as limiting. The ports 398 can be distributed in any arrangement. For example and without limitation, the ports 398 can be distributed near the seal 394, such as in a circumferential pattern. The ports 398 can be any shape or size. The sizing and quantity of the ports 398 can be selected to control dwell time of the upper water level 301. Smaller ports can cause the upper water level 301 of the retained water to fall more slowly while larger ports can cause the upper water level 301 of the retained water to fall more quickly.

Figure 4:
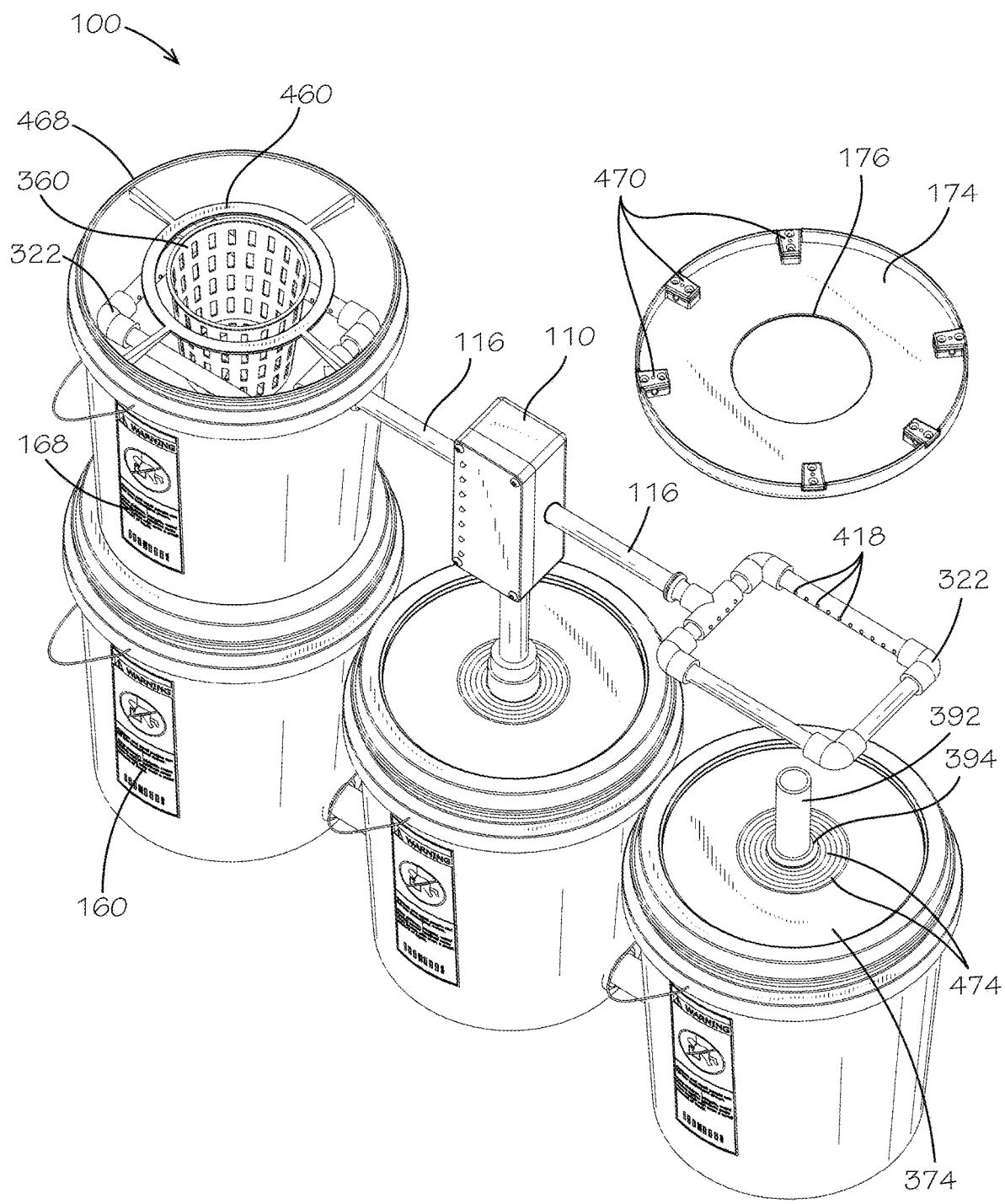
FIG. 4 is a perspective top view of the irrigation assembly and the reservoir of the hydroponic system of FIG. 1, shown with the reservoir in a partially disassembled state.

Turning to FIG. 4, the irrigation assembly 110 and the reservoir 160 of the hydroponic system 100 of FIG. 1 are shown, with the reservoir 160 depicted in a partially disassembled state. Each growing container 168 can comprise the pot 360. Each open lid 174 can be supported by a lid locator 460, which can be fixed to a bottom of the respective open lids 174. The lid locator 460 can position the respective open lids 174 to be centered on the respective growing containers 168.

The open lids 174 can comprise one or more mounting brackets 470. The mounting brackets 470 can be configured to secure the support members 182 (shown in FIG. 1) to the open lids 174.

In the present aspect, the irrigation rings 322 can be shaped as a rounded rectangle, such as a rounded square for example and without limitation. In some aspects, the irrigation rings 322 can define a different shape, such as being circular, elliptical, discorectangular, oval, or polygonal, such as being triangular, quadrilateral, pentagonal, hexagonal, etc. In some aspects, the irrigation branches 116 may not terminate in an irrigation ring 322. For example and without limitation, the irrigation branches 116 can terminate at a spray head, or branched structure, which may or may not be enclosed. In aspects where each growing container 168 contains multiple plants 190 (shown in FIGS. 1-3), the irrigation branches 116 can comprise multiple water distribution features, such as irrigation rings 322, spray heads, or combinations of structures.

The lids 374 of the sump containers 170 can each define one or more raised rings 474. The raised rings 474 can be configured to form a seal with the bottom end 368 (shown in FIG. 3) of the growing containers 168 placed atop them. The raised rings 474 can extend around the drainpipe 392 and the seal 394. In some aspects, the raised rings 474 can be concentric with the seal 394. The raised rings 474 can cooperate with the seal 394 to prevent water leakage between the bottom end 368 and the lids 374, such as while the retained water in the growing container 168 is draining during the residency period.

Figure 5:
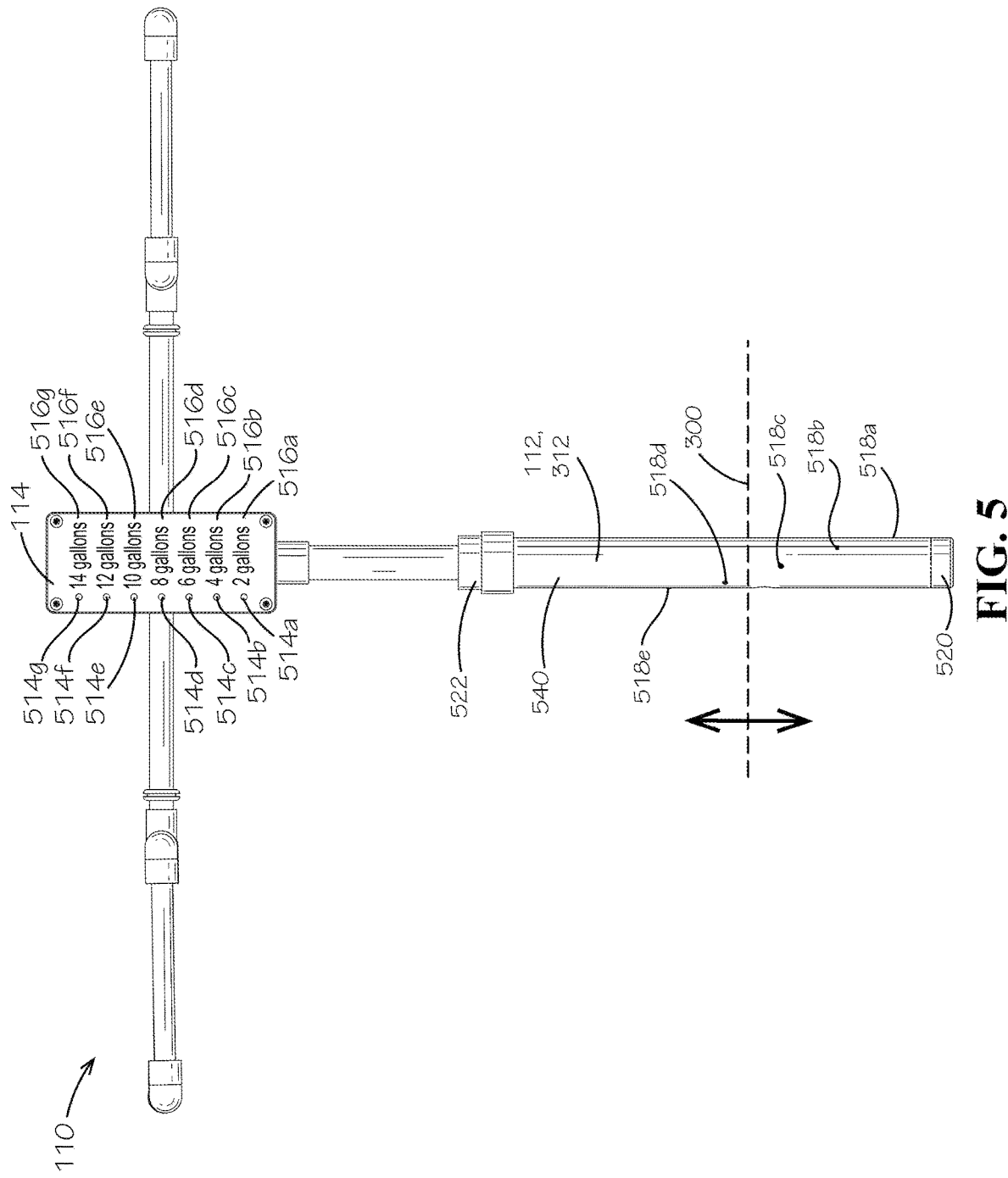
FIG. 5 is a front view of the irrigation assembly of FIG. 1.

FIG. 5 is a front view of the irrigation assembly 110 of FIG. 1. The junction box 114 can comprise one or more indicators 514. In the present aspect, the junction box 114 can comprise seven indicators 514a-g. In other aspects, the junction box 114 can comprise greater or fewer than seven indicators 514a-g. The indicators 514 can be lights, for example and without limitation. Adjacent to each indicator 514, the junction box 114 can define corresponding indicia 516 a-g. The indicia 516 a-g can be decals, painted or otherwise written, raised, or engraved, for example and without limitation.

The indicia 516a-g shown are merely exemplary and should not be viewed as limiting in terms of style, orientation, unit of measure, size, or any other facet. Here, the indicia 516a-g can indicate the volume of water in the sump level 166 (shown in FIG. 1) in gallons. The indicia 516a-g can indicate the volume in a different unit of measure. In some aspects, the indicia 516a-g can indicate a different measurement such as height for example and without limitation.

The indicators 514a-g and the indicia 516a-g can correspond to different heights of the sump water level 300 (shown in FIG. 3 and represented here by a broken line), which in turn can correspond to the volume of water within the sump level 166 based on the size of the sump containers 170 (shown in FIG. 1). The sump water level 300 can rise and fall over time, as denoted by the arrows.

In some aspects, rather than having multiple indicators 514a-g and indicia 516a-g, the junction box 114 can comprise an indicator 514 with a variable output. For example, the indicator 514 can be a screen that can electronically depict the indicia 516, such as by showing a numeric or an alphanumeric sequence for example and without limitation.

Figure 6:
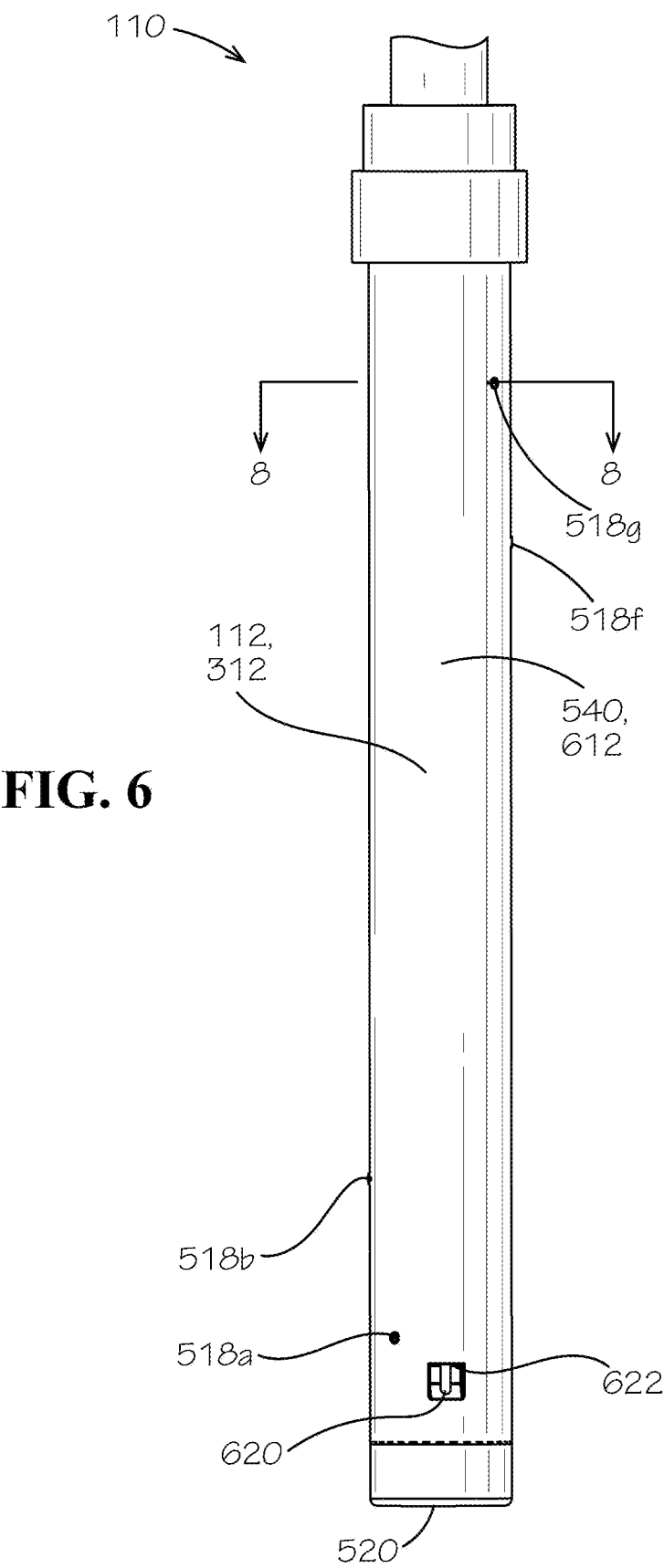
FIG. 6 is a side view of a submersible member of a probe of the irrigation assembly of FIG. 1.

The submersible member 312 can comprise a plurality of indicator electrodes 518a-g (indicator electrodes 518f-g shown in FIG. 6). There can be one indicator electrode 518a-g for each of the indicators 514a-g in the present aspect. Each indicator electrode 518a-g that is submerged below the sump water level 300 can be put in electrical communication with a base electrode 620 (shown in FIG. 6) by conducting electrical current through the water. Electrical communication between the indicator electrodes 518a-g and the base electrode 620 can trigger the corresponding indicators 514a-g. For example, the base electrode 620 can be an opposite electrical terminal from the indicator electrodes 518a-g. In the present aspect, the base electrode 620 can be the positive electrode, and the indicator electrodes 518a-g can each be negative electrodes. In some aspects, the base electrode 620 can be the negative electrode, and the indicator electrodes 518a-g can each be positive electrodes.

Figure 7:
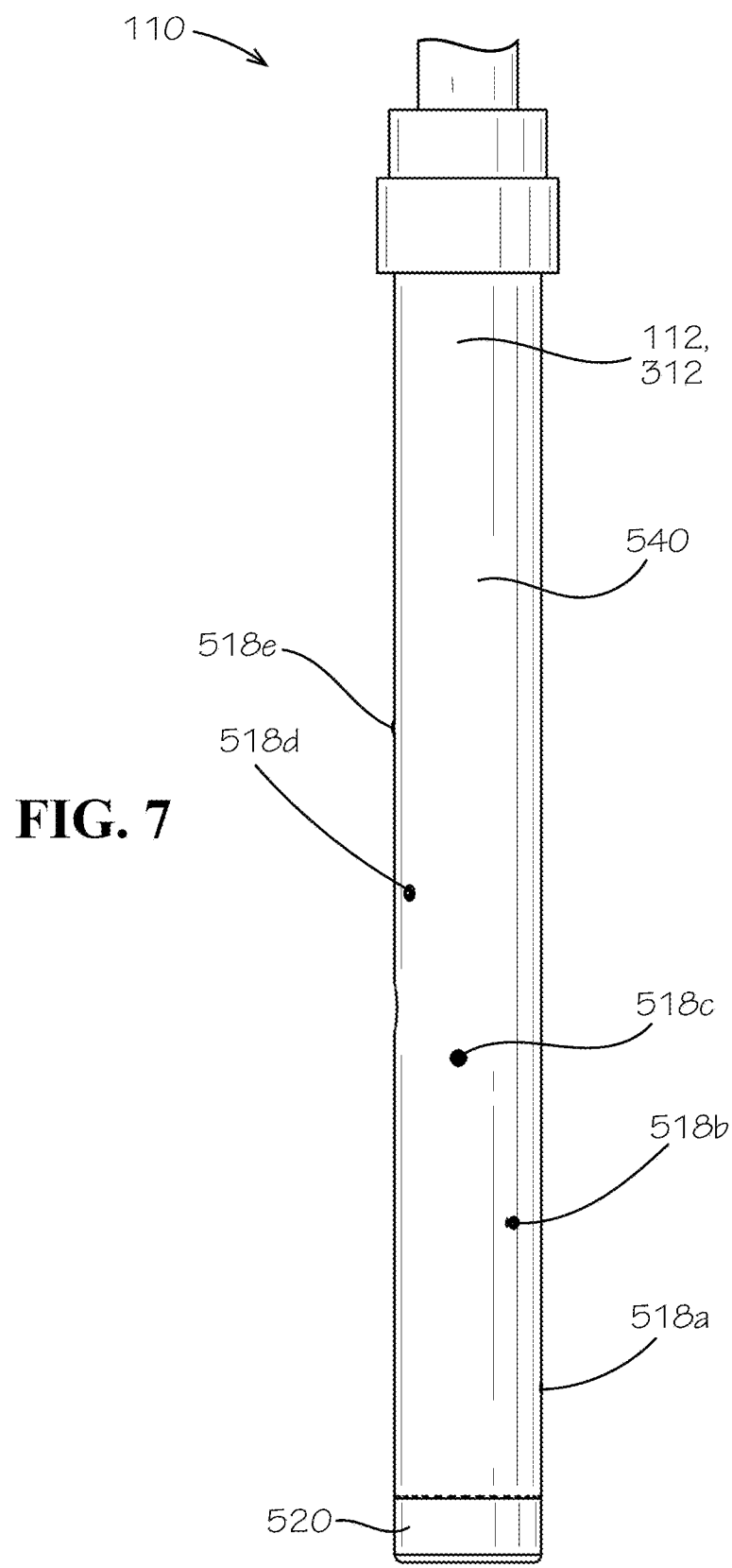
FIG. 7 is another side view of the submersible member of the probe of the irrigation assembly of FIG. 1.

As shown in FIGS. 5-7, the indicator electrodes 518a-g and the base electrode 620 can be distributed at different distances above a bottom cap 520 of the submersible member 312. In the present aspect, the base electrode 620 can be positioned nearest to the bottom cap 520, with the indicator electrode 518a positioned nearest to the base electrode 620, the indicator electrode 518b positioned above the indicator electrode 518a, the indicator electrode 518c positioned above the indicator electrode 518b, and so on to the indicator electrode 518g, which can be positioned furthest from the base electrode 620. In the aspect, shown, the indicator electrodes 518a-g can be distributed in a spiral pattern around the submersible member 312. As the sump water level 300 rises and falls, greater or fewer indicator electrodes 518a-g can be submerged under water and connected in electrical communication with the base electrode 620, and greater or fewer indicators 514a-g can be activated.

For example, in the condition shown in FIG. 5, indicator electrodes 518a-c can be submerged beneath the sump water level 300 while indicator electrodes 518d-g can be dry. In this example, the indicators 514a-c can be in a different condition from the indicators 514d-g. For example, the indicators 514a-c can be lit while the indicators 514d-g can be dark, or vice versa. If the sump water level 300 rises to submerge more of the indicator electrodes 518d-g, the corresponding indicators 514d-g to those newly submerged indicator electrodes can toggle to the opposite condition. Similarly, if the sump water level 300 falls to expose some or all of the indicator electrodes 518a-c, the corresponding indicators 514a-c for the newly exposed indicator electrodes can toggle to the opposite condition. In some aspects, only the submerged indicator 514da-g associated with the highest volume may be lit. For example, in the condition shown in FIG. 5, only indicator 514c may be lit.

As shown in FIG. 6, the base electrode 620 can be positioned within an electrode pocket 622. In some aspects, the base electrode 620 can be molded, or embedded, into a body 540 of the submersible member 312. The base electrode 620 can be at least partially exposed through an outer body surface 612 of the body 540. The base electrode 620 can comprise platinum. In some aspects, the base electrode 620 can comprise platinum-clad titanium. Platinum can be selected because it does not corrode, and platinum does not produce toxic chemicals or ions when utilized as either a positive or negative electrode. For example, platinum does not produce toxic chemicals while sending a voltage through the water (electrolysis) making this material suited for growing foods for consumption.

The body 540 can be an elongated cylindrical body in the present aspect, though this shape should not be viewed as limiting. For example and without limitation, the body 540 can be formed as a polygonal prism. In the aspect shown, the outer body surface 612 can be substantially cylindrical. In the present aspect, the indicator electrodes 518a-g can be stainless steel. For example, the indicator electrodes 518a-g can be stainless steel screws threaded into the body 540. Stainless steel does not produce toxic chemicals or ions when utilized as a negative electrode.

Figure 8:
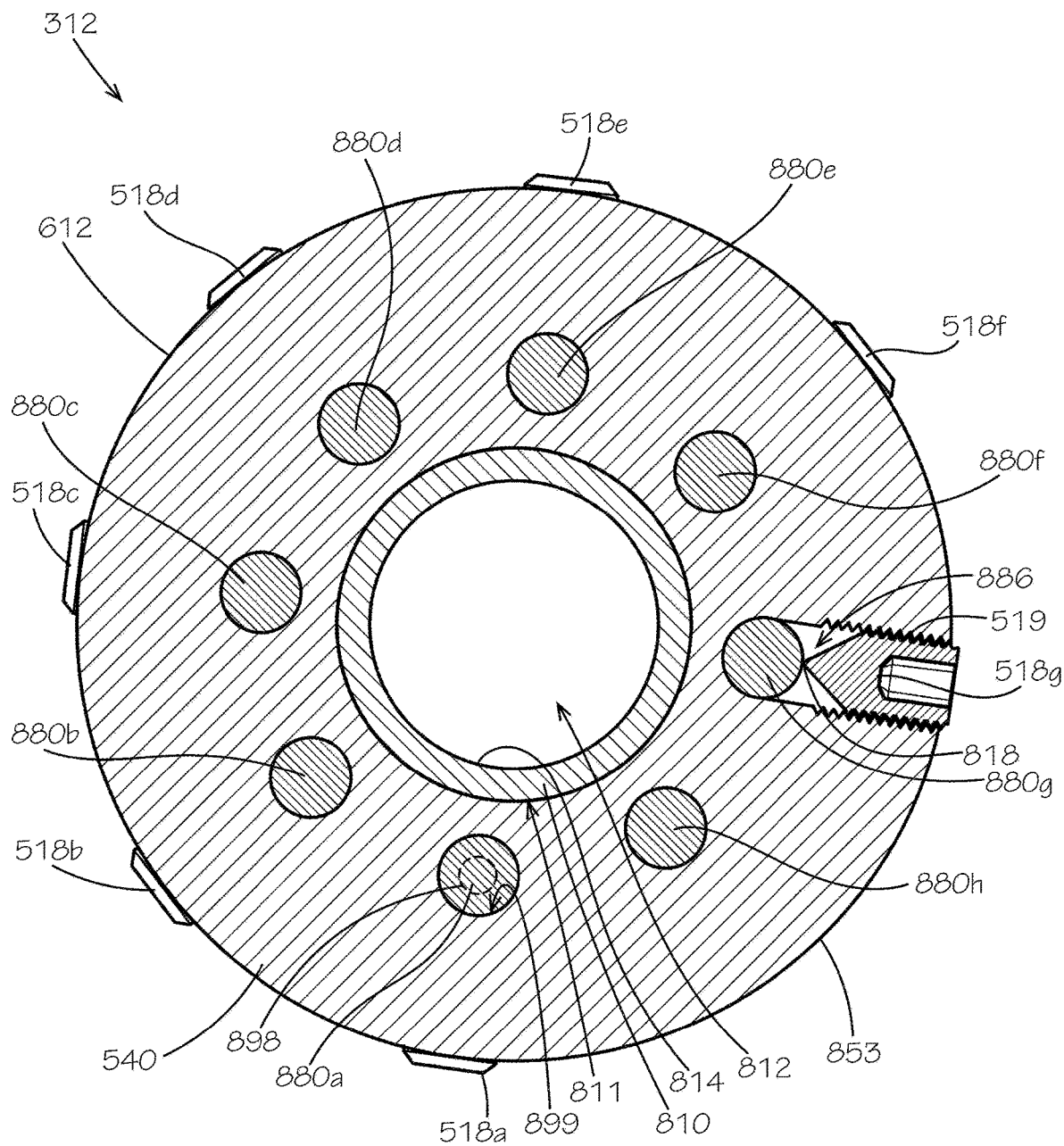
FIG. 8 is a cross-sectional view of the submersible member, taken along line 8-8, shown in FIG. 6.
Figure 9:
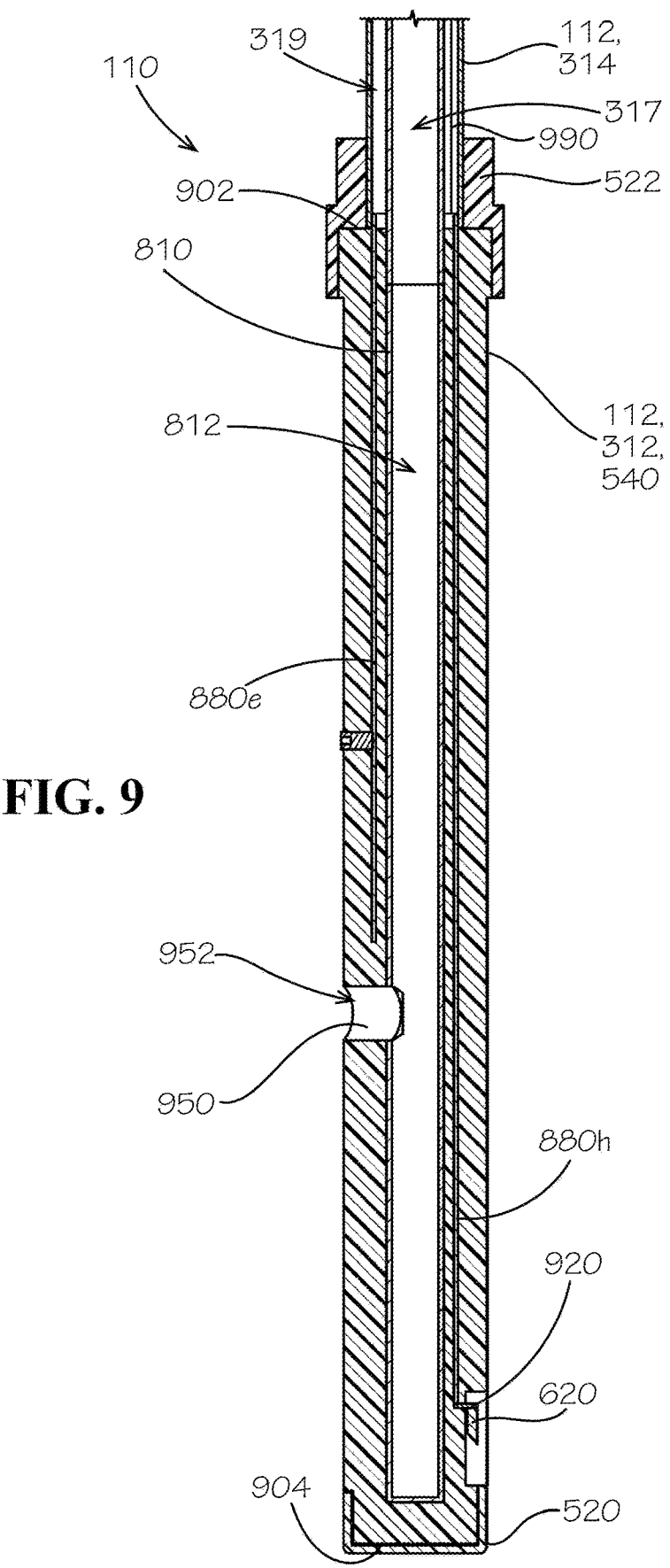
FIG. 9 is a cross-sectional detail view of the submersible member of the probe, taken along line 2-2, shown in FIG. 1.
Figure 10:
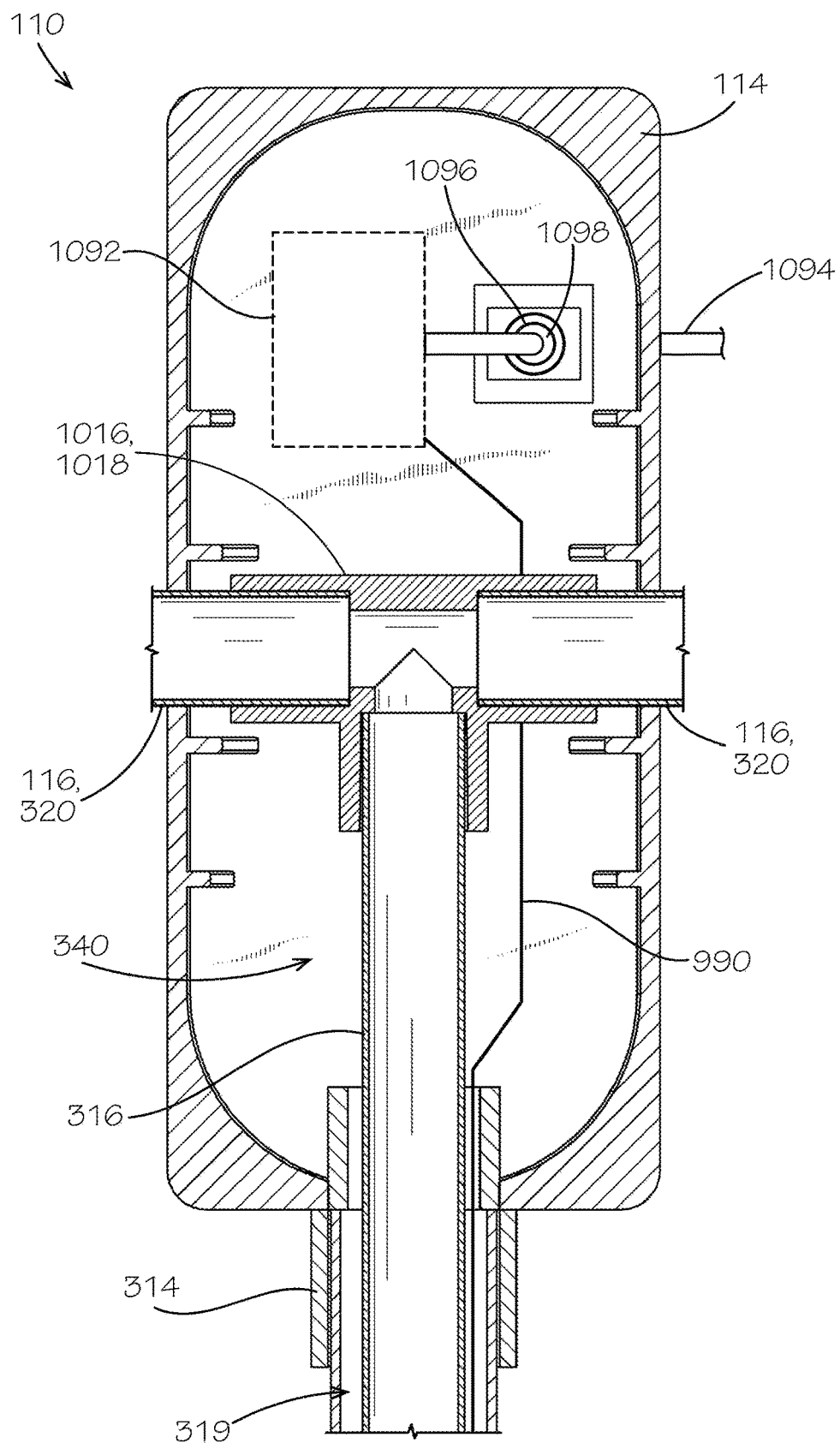
FIG. 10 is a cross-section detail view of a junction box of the irrigation assembly, taken along line 2-2, shown in FIG. 1.

A plurality of conductive member 880a-h (shown in FIG. 8) and wires 990 (shown in FIGS. 9 and 10) can connect the electrodes 518a-g,620 in electrical communication with the indicators 514a-g, as shown and described in greater detail with respect to FIGS. 8-10.

FIG. 8 is a cross-sectional view of the submersible member 312 taken along line 8-8, shown in FIG. 6. Multiple structures of the submersible member 312 and the body 540 are contemplated and disclosed.

The body 540 can be substantially solid with multiple objects molded into or otherwise inserted into the body 540. For example, the plurality of conductive members 880a-h and the base electrode 620 (shown in FIG. 9) can be molded into the body 540. As demonstrated by conductive member 880a, the body 540 can define conductor bores 899 around each of the conductive members. In the aspect shown, the conductive members 880a-h can be positioned in facing engagement with the conductor bores 899. In some aspects, the conductive members 880a-h can be bonded to the conductor bores 899. In some aspects, the body 540 can be formed to define the conductor bores 899, and the conductive members 880a-h can be inserted into the conductor bores 899 after the body 540 has been formed.

In some aspects, the indicator electrodes 518a-g can be molded into the body 540. In some aspects, the body 540 can define bores 886, and the indicator electrodes 518a-g can threadedly engage the bores 886, as demonstrated by the indicator electrode 518g, which can define external threads 519. The indicator electrodes 518a-g can be at least partially exposed through the outer body surface 612 of the body 540. In some aspects, the bores 886 can define pre-formed threads, such as by being tapped, for example and without limitation. In some aspects, the bores 886 can be smooth bores, and the indicator electrodes 518a-g can cut threads into the bores 886 as the indicator electrodes 518a-g are screwed into the bores 886.

A lower bore 812 can extend at least partially through the body 540. In some aspects, the body 540 can define the lower bore 812. For example and without limitation, the body 540 can be molded around a sacrificial core, removable rod, machined, or otherwise shaped to define the lower bore 812. In the aspect shown, an inner pipe 810 can be molded, or embedded, into the body 540, and the inner pipe 810 can define the lower bore 812. An outer surface 811 of the inner pipe 810 can be in contact with the body 540. In some aspects, the inner pipe 810 can define the lower bore 812. In some aspects, the inner pipe 810 can comprise an inner liner 814, and the inner liner 814 can define the lower bore 812.

The inner pipe 810 can comprise a different material from the body 540. For example and without limitation, the inner pipe 810 can be a stainless steel pipe, a PVC pipe, or a CPVC pipe. In some aspects, the inner liner 814 can comprise a food grade material, such as a food grade heat shrink tubing or sleeve, for example and without limitation. For example and without limitations, the material can be a food grade material compliant with United States Code of Federal Regulations, Title 21, Section 177.1330 (21 C.F.R. § 177.1330). The food grade heat shrink tubing can at least partially cover the stainless steel pipe. The food grade heat shrink tubing can define the lower bore 812. In some aspects, an outer liner 853 can cover the body 540. The outer liner 853 can comprise a food grade material, such as a food grade heat shrink tubing for example and without limitation. In some aspects, the outer liner 853 can define the outer body surface 612.

The body 540 can be formed by positioning the embedded structures in a mold and then inserting a liquid, such as a polymer, around the structures to form the body 540. The liquid can be inserted by pouring or injecting the liquid into the mold, for example and without limitation. For example and without limitation, the body 540 can solidify, such as solidification by cooling from a melted state or curing. For example, the liquid can cure, such as through a chemical process, with or without the application of heat to the mold. In some aspects, the body 540 can be formed from a two-part composition, such as an epoxy, urethane, or other material, which can chemically cure and harden after mixing the two parts.

The conductive members 880a-h can be conductive rods, such as metal rods. The conductive members 880a-h can comprise copper, gold, aluminum, iron, steel, silver, platinum, or any other suitable material. In some aspects, the conductive members 880a-h can each be a different type of conductive member, such as a wire, tube, ribbon, bar, or any other suitable form. Outline 898 (shown in broken lines transposed over conductive member 880a) can represent another aspect of conductive member 880a, wherein the conductive member 880a can be sized smaller than and spaced apart from the conductor bore 899. The aspect represented by outline 898 can be representative of any or all of the conductive members 880a-h. For example and without limitation, the conductive member 880a can be a wire, smaller rod, or ribbon inserted into or extending through the conductor bore 899. In the aspect demonstrated by outline 898, portions of the conductive member 880a may or may not incidentally contact the conductor bore 899, such as where the conductive member 880a is not straight or is limber. The conductive members 880a-h may or may not be centered within the respective conductor bores 899. A scale of the outline 898 relative to the conductor bore 899 and a shape of the outline 898 should not be viewed as limiting. For example and without limitation, each conductive members 880a-h can be larger or smaller than the outline 898 while being at least partially spaced apart from the respective conductor bores 899. In some aspects, the outline 898 can defined a different cross-sectional shape, such as a rectangle, for example and without limitation.

In some aspects, a space between any or all of the conductive members 880a-h and the respective conductor bores 899 can be left empty. In some aspects, a space between any or all of the conductive members 880a-h and the respective conductor bores 899 can be at least partially filled, such as with a sealant, dielectric material, caulk, potting material, or any other suitable material.

Each conductive member 880a-h can be in electrical communication with one of the electrodes 518a-g,620 (base electrode 620 shown in FIG. 9). The indicator electrodes 518a-g can be threaded into the bores 886 and engaged with the conductive members 880a-g. For example, a point, or end, 818 of each indicator electrode 518a-g can be tightened against the respective conductive member 880a-g, as demonstrated by indicator electrode 518g. In the aspect shown, the indicator electrodes 518a-g can be cone point set screws, for example and without limitation.

FIG. 9 is a detailed cross-sectional view of the irrigation assembly 110 taken along line 2-2, shown in FIG. 1. The base electrode 620 can be electrically connected to conductive member 880h. As noted above, in some aspects, the base electrode 620 can be molded into the body 540. The base electrode 620 can be secured to the conductive member 880h before molding the body 540 around the base electrode 620. For example and without limitation, a strip of conductive tape 920 can be wrapped around the conductive member 880h and the base electrode 620. The conductive tape 920 can comprise a conductive material, such as copper, silver, gold, aluminum, or other metals or conductive materials.

The top end 902 of the submersible member 312 can be coupled to the bottom of the conduit 314 by the reducer 522 of the probe 112. As demonstrated by the conductive members 880e,h, each conductive member 880a-h can extend through the body 540 to the conduit annular cavity 319, where wires 990 can connect to the conductive members 880a-h and pass through the conduit 314 to the junction box 114 (shown in FIG. 1). For example and without limitation, the wires 990 can be soldered to the conductive members 880a-h, physically connected to the conductive members 880a-h, such as by wrapping the wires 990 around the conductive members 880a-h or clamping the wires 990 to the conductive members 880a-h, for example and without limitation, or connected by any other suitable electrically conductive connection technique. The conductive members 880a-h can protrude above the top end 902 of the submersible member 312, as demonstrated by the conductive members 880e,h. The tops of the conductive members 880a-h, the wires 990 (shown in FIG. 10), and the connections therebetween can be protected from water in the hydroponic system 100 within the conduit annular cavity 319. As shown, each conductive member 880a-h can extend from the top end 902 of the submersible member 312 downwards through the body 540 towards a bottom end 904 of the submersible member 312, which can be covered by the bottom cap 520. In some aspects, one or more of the conductive members 880a-h can be exposed at the bottom end 904, and the bottom cap 520 can cover and electrically insulate one or more of the conductive members 880a-h.

An inlet bore 952 of an inlet 950 can intersect the lower bore 812 of the inner pipe 810. The inlet bore 952 can extend through the body 540. In some aspects, the inlet 950 and the inlet bore 950 can be defined by the body 540. In some aspects, inner pipe 810 can comprise the inlet 950 and define the inlet bore 952.

As demonstrated by conductive members 880e,h, some of the conductive members 880a-h can be longer or shorter than others. Conductive member 880h can extend nearly to or to the bottom cap 520, while conductive member 880e can terminate above the inlet 950. In some aspects, the lengths of the conductive members 880a-h can be determined by the position of the connected electrodes 518a-g, 620 (shown in FIGS. 5-7). For example, in some aspects, conductive member 880h, which connects to the base electrode 620, can be the longest, and conductive member 880g, which connects to the highest indicator electrode 518g, can be the shortest.

The upper bore 317 of the conduit 314 can be connected and sealed in fluid communication with the lower bore 812 of the submersible member 312. The inlet bore 952 can be connected in fluid communication with the lower bore 812. During operation, the sump pump 310 (shown in FIG. 3) can pump water from the sump level 166 (shown in FIG. 3) of the reservoir 160 (shown in FIG. 3) into the submersible member 312 of the probe 112 through the inlet bore 952 of the inlet 950. The water can then flow into the lower bore 812 of the submersible member 312 and upwards through the upper bore 317 of the conduit 314 to the junction box 114 (shown in FIG. 3) and irrigation branches 116 (shown in FIG. 3).

FIG. 10 is a detailed cross-sectional view of the junction box 114 and the conduit 314 of the irrigation assembly 110, taken along line 2-2 of FIG. 1.

The inner pipe 316 of the conduit 314 can extend into the junction box cavity 340, where the inner pipe 316 can connect in fluid communication with a manifold 1016. The manifold 1016 can be connected in fluid communication with the pipes 320 of the irrigation branches 116. In the present aspect, the manifold 1016 can be a tee fitting 1018, which can connect to two irrigation branches 116. In some aspects, the manifold 1016 can define a more complex shape, such as in aspects where the manifold 1016 connects the inner pipe 316 to more than two irrigation branches 116. In some aspects, the manifold 1016 can comprise one or more valves (not shown), which can be opened and closed to reroute flow through the hydroponic system 100.

The inner pipe 316, the pipes 320, and the manifold 1016 can be sealed, which can protect the surrounding junction box cavity 340 from exposure to water. In some aspects, water may not be routed through the junction box cavity 340. In some aspects, the junction box cavity 340 can be partitioned into a wet portion and a dry portion, and the water can be routed through the wet portion while electrical components can be isolated in the dry portion.

The wires 990 can pass from the conduit annular cavity 319 of the conduit 314 to the junction box cavity 340. In some aspects, the wires 990 can connect directly to the indicators 514a-g (shown in FIG. 5). In some aspects, the wires 990 can connect to a printed circuit board ("PCB") 1092, which in turn can be connected to the indicators 514a-g. In some aspects, the PCB 1092 can control the sump pump 310 (shown in FIG. 3). For example and without limitation, the sump pump 310 can be operated on a repeating interval, such as running 15 minutes on and then powering off for 15 minutes to allow water to drain to the sump level 166 (shown in FIG. 3) of the reservoir 160 (shown in FIG. 3). These times should not be viewed as limiting, and the sump pump 310 can be operated at any interval or variable intervals, including intervals where the on/off times are not equal to one another in duration. The PCB 1092 can also include shutoff features. For example, if the water level falls below the lowest indicator electrode 518a (shown in FIG. 5), the PCB 1092 can prevent the sump pump 310 from running, such as to avoid potential damage to the sump pump 310 that may occur if the sump pump 310 is run dry.

The PCB 1092 can receive power from a power supply cable 1094. The power supply cable 1094 can be routed through a cable opening 1096 in the junction box 114. The cable opening 1096 can be sealed around the power supply cable 1094, such as with a gland 1098 or other type of seal.

The materials utilized for each component of the hydroponic system 100 can be selected for health and environmental safety. In some aspects, the plants 190 (shown in FIG. 1) can be grown for human consumption. The materials can be selected from approved food-safe materials by governing bodies, such as the Food and Drug Administration ("FDA") of the United States federal government or other regulatory bodies. Where structural or manufacturing considerations require materials that are not approved food-safe materials, coatings, films, linings, sleeves, or other barriers comprising food-safe materials can be utilized to prevent contact between unapproved materials and the water or the plants 190 of the hydroponic system 100.

When plants 190 are grown hydroponically, the primary source of nutrients delivered to the plants 190 can be provided through the water in the system. For example, the plants 190 can absorb aqueous nutrients and minerals dissolved within the water. Concentrations of nutrients and minerals that are too high or too low can negatively impact the health of the plants 190. Because the probe 112 provides an indication of the volume of water within the hydroponic system 100, a user or operator can calculate the appropriate amounts of fertilizers and other supplements to add to the water to achieve the desired concentrations of nutrients and minerals.

A method for forming a submersible member 312 can comprise positioning a first conductive member and a second conductive member in a mold; positioning a base electrode in the mold; connecting the base electrode in electrical communication with the first conductive member; inserting a liquid into the mold around the first conductive member, the second conductive member, and the base electrode; solidifying the liquid to form a body, the first conductive member, the second conductive member, and the base electrode embedded within the body; and forming a lower bore within the body extending from a top end of the body towards a bottom end of the body.

In some aspects, solidifying the liquid can comprise curing the liquid to form a solid material. In some aspects, solidifying the liquid can comprise cooling a molten liquid until it solidifies. In some aspects, solidifying the liquid can comprise baking, or heat-curing, the liquid until it solidifies.

In some aspects, connecting the base electrode in electrical communication with the first conductive member can comprise attaching the base electrode to the first conductive member with a conductive tape. In some aspects, forming the lower bore within the body can comprise positioning a pipe within the mold; inserting the liquid around the pipe; and solidifying the liquid to form the body around the pipe. In some aspects, the method can further comprise applying a food grade sleeve to the pipe.

In some aspects, the method can further comprise screwing an indicator electrode into the body until the indicator electrode contacts and connects in electrical communication with the second conductive member.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A submersible member comprising:
   an elongated body defining an outer body surface, the body defining a top end and a bottom end;
   a base electrode comprising an electrical terminal extending through a recessed base electrode pocket of the outer body surface of the elongated body;
   a first conductive member extending through the body from the top end to the base electrode, the first conductive member connected in electrical communication with the base electrode;
   an indicator electrode extending through a recessed indicator electrode pocket of the outer body surface of the elongated body, the indicator electrode positioned between the top end and the base electrode; and a second conductive member extending through the body from the top end to the indicator electrode, the second conductive member connected in electrical communication with the indicator electrode, wherein an electrical polarity of the electrical terminal of the base electrode is opposite the electrical polarity of the indicator electrode, wherein the indicator electrode is a cone point set screw, and wherein the indicator electrode is screwed into a bore of the body and tightened until the cone point enters the second conductive member.

2. The submersible member of claim 1, wherein the base electrode and the first conductive member are embedded in the recessed base electrode pocket of the body.

3. The submersible member of claim 1, wherein the indicator electrode threadedly engages the body and threadedly tightens against the second conductive member.

4. The submersible member of claim 1, wherein the base electrode comprises platinum.

5. The submersible member of claim 1, wherein the indicator electrode is a first indicator electrode, and the submersible member further comprises:
 a second indicator electrode extending through the outer body surface, the second indicator electrode positioned between the top end and the first indicator electrode; and
 a third conductive member extending through the body in a direction parallel to the outer body surface from the top end to the second indicator electrode, the third conductive member connected in electrical communication with the second indicator electrode.

6. The submersible member of claim 1, wherein:
 an inlet bore extends through the outer body surface;
 a lower bore extends from the top end towards the bottom end; and
 the inlet bore intersects the lower bore.

7. The submersible member of claim 1, wherein a bottom cap covers and electrically insulates the first conductive member.

8. The submersible member of claim 1, wherein the first conductive member extends through a first bore and the second conductive member extends through a second bore.

9. A submersible member comprising:
 an elongated body defining an outer body surface, the body defining a top end and a bottom end;
 a base electrode comprising an electrical terminal extending through a recessed base electrode pocket of the outer body surface of the elongated body;
 a first conductive member extending through the body from the top end to the base electrode, the first conductive member connected in electrical communication with the base electrode;
 an indicator electrode extending through a recessed indicator electrode pocket of the outer body surface of the elongated body, the indicator electrode positioned between the top end and the base electrode; and
 a second conductive member extending through the body from the top end to the indicator electrode, the second conductive member connected in electrical communication with the indicator electrode, wherein an electrical polarity of the electrical terminal of the base electrode is opposite the electrical polarity of the indicator electrode, wherein an inlet bore extends through the outer body surface and intersects a lower bore extending from the top end to the bottom end, and wherein the first conductive member extends below the inlet bore and the second conductive member terminates above the inlet bore.

10. A submersible member comprising:
 an elongated body defining an outer body surface;
 a first conductive member extending through the elongated body in a direction parallel to the outer body surface from a top end of the elongated body to a base electrode extending from the first conductive member to the outer body surface of the elongated body; and
 a second conductive member extending through the elongated body in a direction parallel to the outer body surface from the top end of the elongated body to an indicator electrode extending from the second conductive member to the outer body surface of the elongated body, the indicator electrode positioned in the elongated body between the top end and the base electrode;
 wherein an electrical polarity of the base electrode is opposite the electrical polarity of the indicator electrode,
 wherein the base electrode comprises a cone point that extends through a recessed base electrode pocket in the outer body surface and pierces the first conductive member to electrically couple the base electrode to the first conductive member; and the indicator electrode comprises a cone point that extends through a recessed indicator electrode pocket in the outer body surface and pierces the second conductive member to electronically couple the indicator electrode to the second conductive member.

11. The submersible member of claim 10, wherein the second conductive member extends in the elongated body below the indicator electrode in a direction parallel to the outer body surface.

12. A submersible member comprising:
 an elongated body defining an outer body surface;
 a first conductive member extending through the elongated body in a direction parallel to the outer body surface from a top end of the elongated body to a base electrode extending from the first conductive member to the outer body surface of the elongated body;
 a second conductive member extending through the elongated body in a direction parallel to the outer body surface from the top end of the elongated body to an indicator electrode extending from the second conductive member to the outer body surface of the elongated body, the indicator electrode positioned in the elongated body between the top end and the base electrode; and
 an inlet bore that intersects a lower bore extending though the elongated body, and wherein the first conductive member extends to a bottom cap of the elongated body and the second conductive member terminates above the inlet bore
 wherein an electrical polarity of the base electrode is opposite the electrical polarity of the indicator electrode.

13. The submersible member of claim 12, wherein the elongated body comprises a bore fluidly coupled to an irrigation ring, the elongated body being configured to communicate a fluid through the bore and into the irrigation ring.

14. The submersible member of claim 13, wherein the irrigation ring comprises a plurality of inward facing openings.

15. A submersible member comprising:
 an elongated body defining an outer body surface of a body, an inner pipe within the body, and a lower bore extending through the inner pipe;

a first conductive member extending through a first bore in the body of the elongated body, the first conductive member extending to a base electrode extending through the body from the first conductive member in the first bore of the body to a first pocket in the outer body surface of the elongated body; and a second conductive member extending through a second bore in the body of the elongated body, the second conductive member extending to an indicator electrode extending through the body from the second conductive member in the second bore of the body to a second pocket in the outer body surface of the elongated body, the indicator electrode positioned above the base electrode;

wherein an electrical polarity of the base electrode is opposite the electrical polarity of the indicator electrode, wherein the base electrode comprises a cone point that extends through a recessed base electrode pocket in the outer body surface and pierces the first conductive member to electrically couple the base electrode to the first conductive member; and the indicator electrode comprises a cone point that extends through a recessed indicator electrode pocket in the outer body surface and pierces the second conductive member to electronically couple the indicator electrode to the second conductive member.

16. The submersible member of claim 15, further comprising a second indicator electrode coupled to a third conductive member extending through a third bore in the body of the elongated body, the third conductive member extending to the second indicator electrode extending through the body from the third conductive member in the third bore of the body to a third pocket in the outer body surface of the elongated body, the second indicator electrode positioned above the base electrode.

17. The submersible member of claim 16, wherein the second indicator electrode comprises a cone point that extends through the third pocket in the outer body surface and pierces the third conductive member to electronically couple the second indicator electrode to the third conductive member.

* * * * *